Dec. 16, 1952  A. W. COGGINS ET AL  2,621,773
BARN CLEANER
Filed Sept. 17, 1948  2 SHEETS—SHEET 1
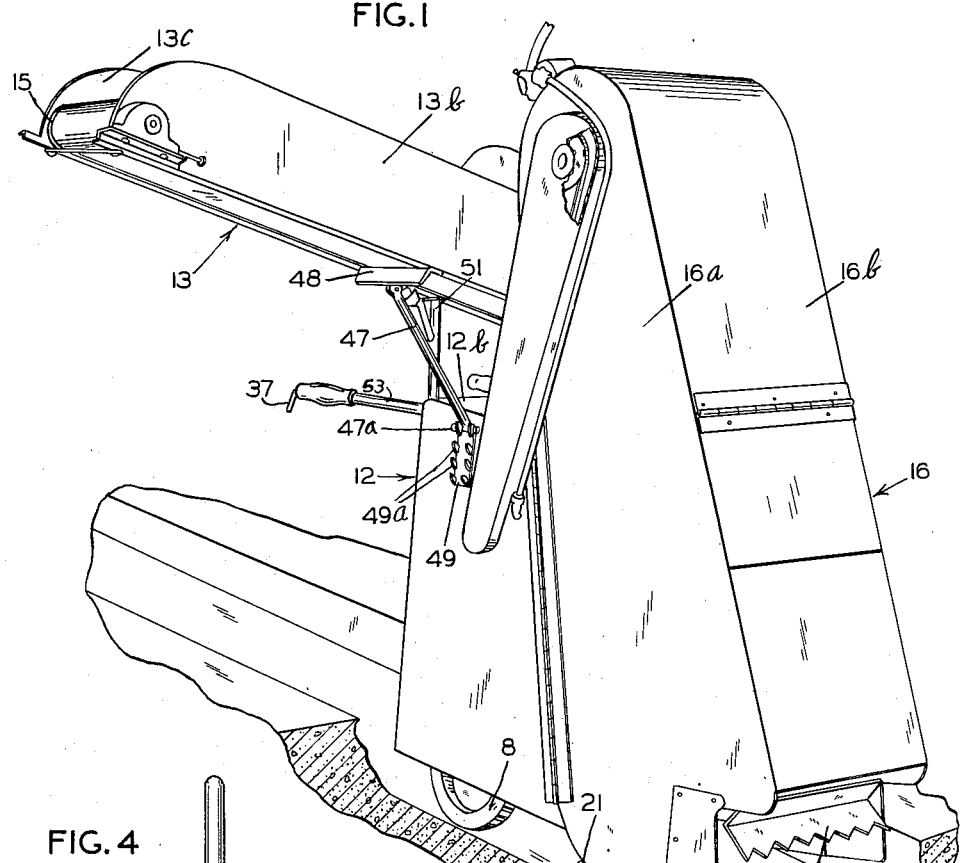
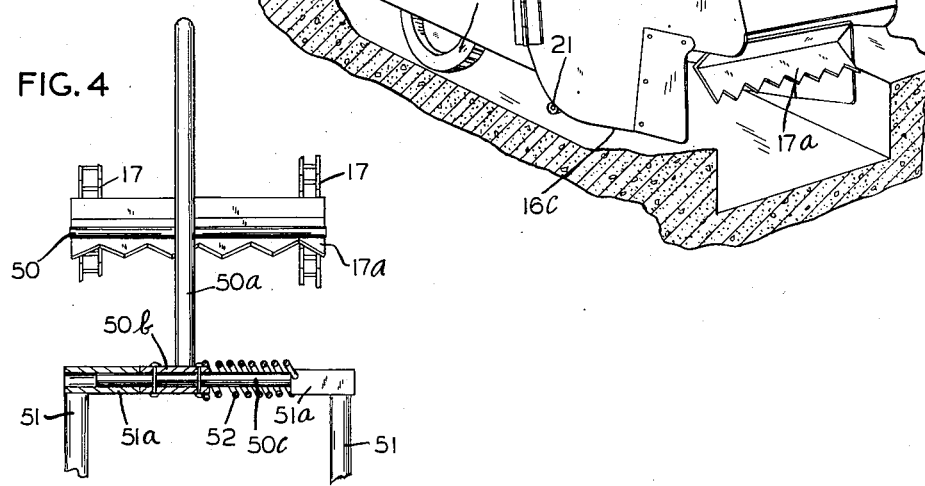
INVENTOR.
ARCHIE W. COGGINS
FRANK W. COGGINS
BY MELVIN J. COGGINS
Williamson & Williamson
ATTORNEYS Dec. 16, 1952 A. W. COGGINS ET AL 2,621,773
BARN CLEANER
Filed Sept. 17, 1948 2 SHEETS—SHEET 2
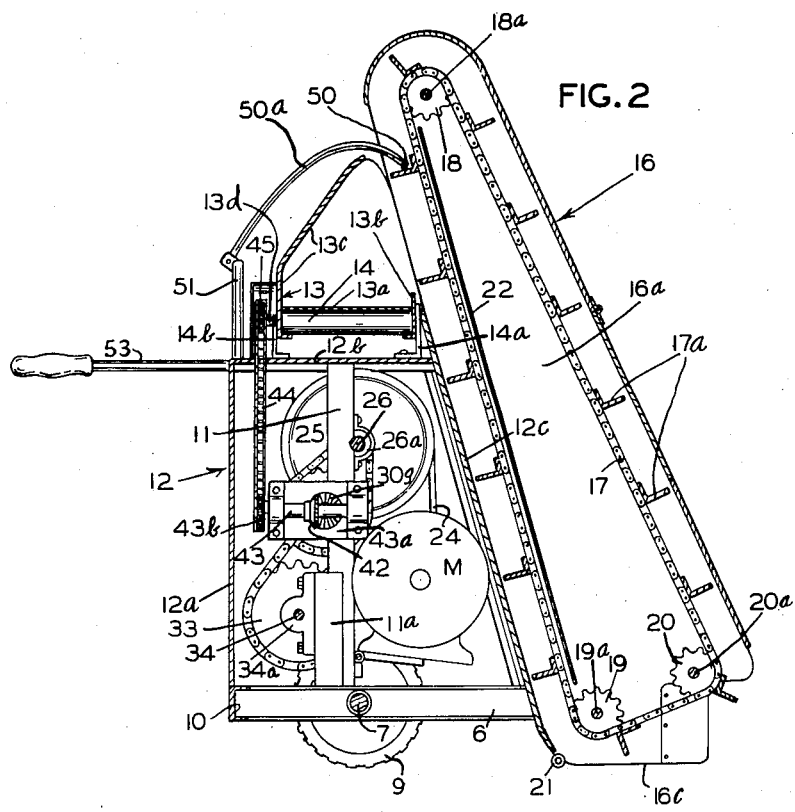
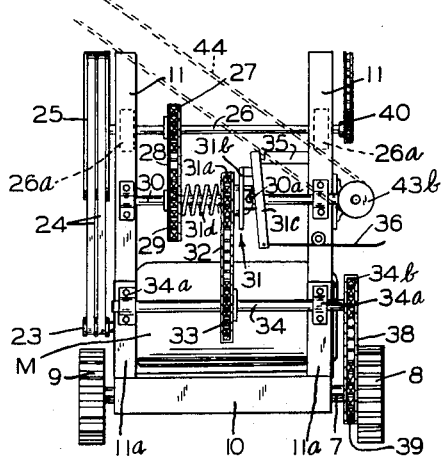
INVENTOR.
ARCHIE W. COGGINS
FRANK W. COGGINS
BY MELVIN J. COGGINS
*Williamson & Williamson*
ATTORNEYS Patented Dec. 16, 1952

2,621,773

UNITED STATES PATENT OFFICE 2,621,773

BARN CLEANER

Archie W. Coggins, Frank W. Coggins, and Melvin J. Coggins, Cornell, Wis.

Application September 17, 1948, Serial No. 49,704

1 Claim. (Cl. 198—11)

This invention relates to portable barn cleaners and particularly to a compact apparatus for picking up, removing and loading manure from the gutters of dairy and stock barns. The invention is an improvement on the structure disclosed in our co-pending application, entitled "Barn Cleaning Machine," Serial Number 758,312.

It is an object of our present invention to provide an improved, highly efficient, unitary machine which is readily accommodated and preferably self-propelling in the manure trough or gutter of a barn and which will quickly and efficiently clean such troughs and gutters and remove the material therefrom, through power operation contained in the machine.

Another object is the provision of an improved barn cleaning machine of the class described, which is readily portable from place to place and is embodied in a compact unit and which combines in an integral mechanism, a cleaning and pick-up device for operating upon the full width of a barn gutter as well as an elevator to lift the engaged material to a loader for delivery and removal of manure and other material to a litter-carrier bucket, spreader, wheelbarrow or other vehicle.

A further object is the provision of a compact, portable barn cleaner which is self-propelled under the instant control of an operator and which will efficiently and thoroughly scrape up all material from a barn gutter, elevate such material as the machine travels down the gutter and deliver the elevated material to a cross, loading conveyor adjustably mounted on the machine and driven thereby whereafter the collected material may be continuously loaded in a litter carrier or upon a manure spreader or other vehicle.

A still further object is the provision of a portable and unitary barn cleaning machine which occupies a minimum amount of floor space while providing its own power plant and adjustable loading conveyor; which contains novel and efficient mechanism for scraping up and sweeping manure progressively into the elevator structure and which is provided with a cross conveyor for unloading, which may be readily swung to clear obstructions in the travel of the machine.

These and other objects and advantages of our invention will be more apparent from the following description made in connection with the accompanying drawings wherein like reference characters refer to similar parts throughout the several views and in which:

Fig. 1 is a perspective view taken from the delivery side and front of a commercial embodiment of our improved barn cleaner shown in operation in a barn gutter;

Fig. 2 is a vertical section taken along a plane disposed parallel to and just inwardly of the right hand side of the machine;

Fig. 3 is a rear elevation showing the frame work wheels and driving mechanism and connections of our machine stripped of the various housings and conveyor mechanisms;

Fig. 4 is a rear detail view in elevation showing a yieldably supported stripper mechanism for engaging the scraper paddles of our structure in their extreme upward movement.

In the form of the invention disclosed, we provide a compact upstanding frame comprising, at the bottom thereof, a pair of horizontal I beams 6 which extend longitudinally of the device and have journaled in suitable bearings thereon a transverse axle shaft 7 to the ends of which right and left traction wheels 8 and 9 respectively are affixed. The rear ends of the short I beams 6 are rigidly secured together in spaced relation by a transverse I beam 10, and a pair of upstanding supporting posts 11 are rigidly secured at their lower ends as by welding to the medial portions of side beams 6 and serve to support the motor or engine M as well as a considerable portion of the driving mechanism.

A rear, box-like housing, indicated as an entirety by the numeral 12, is secured to the frame described, forming an enclosure for the motor M, for the upper portions of the traction wheels 9 and for transmission and clutch mechanism as well as several sockets and belt pulleys all forming part of the driving and power transmission mechanism of our device. Housing 12 has a rear vertical wall 12a closing the rear of the machine and a top, horizontal wall 12b which forms a support for swingably anchoring the inner end of a cross conveyor indicated as an entirety by the numeral 13 and which is adapted to deliver and load material into a litter bucket, manure spreader, or the like. The cross, loading conveyor 13 as shown, comprises an endless flexible apron 13a trained about a driven roller 14 at its inner end and trained about an idler roller 15 at its outer or delivery end, the axle shaft of said inner roller 14 extending longitudinally of the machine and being journaled at its ends in suitable upstanding supporting brackets 14a and 14b respectively, the ends of said shafts being pivotally accommodated in the upstanding side walls 13b and 13c of the cross-conveyor frame.

The front of housing 12 is closed by a large rectangular plate 12c which is inclined rearwardly from its lower end at a slight angle to the vertical and which at its forward face forms an upstanding elevator-shaft wall.

Secured to the front of the upstanding wheeled frame and supported thereby and preferably detachably connected with the housing 12, we provide an upstanding, sealed elevator housing designated as an entirety by the numeral 16, of general triangular side configuration with its bottom or base of the triangle at one corner disposed for engagement with the ground or a barn gutter and with its upper end or apex extending a substantial distance above the horizontal shelf 12b of the rear frame housing and extending a short distance above the upper edges of cross conveyor 13. The sealed, elevator housing 16 is rigidly affixed to the frame and is provided with parallel upstanding side walls 16a and a rearwardly inclined front wall 16b which may be integrally formed with the side walls. The inclined upstanding plate or wall 12c constitutes the rear wall of the sealed housing.

Mounted within the elevator housing 16, we provide a simple and highly efficient endless conveyor mechanism which performs the dual function of thoroughly cleaning a barn gutter by scraping up and collecting manure and other material therefrom and then elevating such collected material and discharging the same upon the cross or loading conveyor 13, the functions of said mechanism being continuous during the travel of the machine in a barn gutter. Said dual-function conveyor mechanism as illustrated comprises a pair of endless sprocket chains 17 trained in spaced parallel relation over driven sprockets 18 at the upper end of the conveyor and trained about a pair of spaced idler sprockets 19 and 20 respectively at the lower or receiving end of the conveyor mechanism. The three shafts 18a, 19a, and 20a upon which said two sets of conveyor sprockets are affixed extend horizontally and transversely of the frame of the machine at the front portion thereof and are related triangularly as clearly shown in Figure 2, said shafts being suitably journaled in bearings affixed to the side walls 16a of housing 16. The lower idler sprockets 19 are disposed above the rear rounded corners at the bottom of housing 16 a short distance above the ground or barn gutter to be cleaned while the idler sprockets 20 spaced a short distance forwardly of sprockets 19 are disposed at a higher level causing the endless conveyor to have a pick-up or collecting section or leaf at its lower end declined rearwardly from the very front of the machine to cause the conveyor scraper paddles 17a, affixed transversely to chain 17, to move inwardly in their scraping and collection action from a position adjacent the top of the trough or gutter to an extreme rearward or inward position substantially tangential to the bottom of the gutter. Scraper paddles 17a may be constructed of any suitable rigid or semi-rigid material such as metal or stiff rubber composition and preferably have serrated outer longitudinal edges which extend transversely of the conveyor mechanism. The height of said scraper paddles 17a is such that the tangential relationship described will be effected and that the outer edges of said paddles will lightly scrape or work in slight clearance to the upstanding elevator wall partition 12c, whereby in the upward movement of the endless conveyor the material collected by the scraping and inward sweeping action will be elevated to a point above the receiving end of the cross conveyor or delivery conveyor 13. The upstanding, forward side wall 13b of the cross conveyor is recessed at its inner end, as shown in Figure 2, to enable the elevated material to be dumped directly upon the inner or receiving end of the endless apron 13a.

At the lower, rearward corners of the side walls 16a of elevator housing 16, we prefer to provide small supporting rollers 21 journaled on axes disposed transversely of the machine and positioned with reference to the lower horizontal edges of side walls 16a so that when the frame of the machine is tilted very slightly in a rearward direction upon axle shaft 7, the greater portion of the weight of the elevator housing 16 and the dual-purpose conveyor mechanism therein may be supported from said rollers 21 with slight clearance between the lower edges 16c of the housing and the barn trough in which our machine is operated. As shown an upstanding slightly inclined partition 22 extending parallel to the upstanding plate 12c (see Fig. 2) may be provided to positively prevent any shreds of material during elevation from being dropped inwardly. It is to be understood that the partition 22 may be dispensed with without sacrificing material efficiency.

We prefer to make our machine self-propelling. To this end, as shown in Figures 2 and 3, a clutch controlled driving mechanism is interposed between the power take-off shaft of the motor or engine end and the driven wheel axle 7. As shown, the left-hand end of the armature shaft of motor M is provided with a double V-belt pulley 23 connected by endless V-belts 24 with a relatively very large V-belt pulley 25 affixed to the left end of a cross shaft 26 which is journaled in suitable bearings 26a affixed to the intermediate portions of the vertical supporting posts 11. The shaft 26 has affixed thereto a sprocket 27 which is connected by an endless chain 28 for driving a larger chain sprocket 29 affixed to a second cross shaft 30 which is also suitably journaled below the shaft 26 in bearings attached to the posts 11. A clutch mechanism indicated as an entirety by the numeral 31 is interposed between the driven shaft 30 and an endless driving chain 32 trained about a driving pinion constituting a part of clutch collar 31a slidably mounted on shaft 30 and a larger driven sprocket 33 affixed to a lower countershaft 34. Countershaft 34 as shown is disposed below and somewhat rearwardly of the shaft 30 being journaled in bearings 34a affixed to the rear sides of spacer blocks 11a which are secured to the lower portion of the angle posts 11. As shown the clutch mechanism 31 includes a driving diametric pin 30a affixed to shaft 30 for engagement with teeth or notches provided in the right-hand edge of the collar 31a. A shipper fork 31b is affixed to clutch lever 31c straddling collar 31a and adapted to press inwardly against an enlarged flange of said collar to shift the collar and pinion to the left against the resilient force of a coil spring 31d which is interposed between the sprocket 29 and the left end of sprocket collar 31a, said spring surrounding the shaft 30. Clutch operating lever 31a is fulcrumed at its upper end upon the point of a lug 35 and its lower end is connected as shown by a flexible cable 36 to a swingable clutch control handle arm 37 mounted on one of the guiding handles at the exterior of the machine (see Fig. 1). The driven countershaft 34 has affixed to its right end a chain-driving sprocket 34b which is connected for driving by an endless chain 38 with a relatively large sprocket 39 affixed to the driving axle 7 of the traction wheels. We prefer to connect the driven axle 7 with the wheels with conventional dog differential mechanism (not shown). From the foregoing it will be seen that the traction wheels 9 are driven at greatly reduced speed through the several driving connections from the motor or engine M.

The pick-up and elevator conveying mechanism at the front of the machine is driven from the upper cross shaft 26 through a sprocket 26a affixed to the right-hand end thereof and an endless driving chain 40 trained about sprocket 26a and about a driven sprocket 41 secured to the right end of the driven conveyor shaft 18a.

The cross or loading conveyor comprising the endless apron 13a is driven as shown from the right-hand end of shaft 30 (see Figs. 2 and 3) through bevel gears 30g and 42, bevel gear 42 being affixed to the forward end of a stub shaft 43 which is suitably journaled upon the frame by a bracket 43a, said stub shaft carrying at its rear end a driving sprocket 43b which is connected by an endless chain 44 with a driven sprocket 45 affixed to the rear end of the roller shaft 14c which is journaled at the inner end of the loading conveyor.

Loading conveyor 13 is hinged for swingable adjustment by the pivotal connection between the ends of roller shaft 13d with the upstanding side walls 13b and 13c. To support the loading conveyor in a variety of angularly adjusted positions, a quickly releasable diagonal brace is provided as shown, comprising a rigid arm 47 (Fig. 1) pivoted at its upper end to a bar 48 transversely secured to the lower edges of conveyor walls 13b and 13c. As shown, the lower end of diagonal brace 47 is provided with a T-head 47a which selectively engages any one of a plurality of sets of outwardly projecting lugs 49a formed on the face of a bracket 49 which as shown, is attached to the right hand side of the frame housing 12.

We prefer to provide a simplified mechanism for cleaning and stripping the individual scraping paddles 17a in their extreme upward travel to assure maximum delivery of material upon the receiving end of the cross conveyor. To this end, as shown, we provide a swingable stripper bar 50 of substantially the length of the individual paddles 17a disposed horizontally and transversely of the machine, as shown in Figs. 2 and 4 and supported from the forwardly and downwardly bent outer end of a rigid supporting bar 50a which is connected at its rear end by a transverse sleeve 50b with horizontal sockets 51a carried by the upper ends of short supporting posts 51. Sleeve 50b as shown, is pivotally connected with the sockets through an elongated shaft or pintle member 50c which is affixed to the sleeve and has its ends journaled in sockets 51a. A coil torsional spring 52 surrounds a portion of the pintle 50c and has one of its ends affixed to one of the sockets 51 while its other end is affixed to sleeve 50b, said spring urging the arm or bar 50a forwardly to cause the transverse stripper bar 50 to be disposed in the path of the medial portions of the individual paddles 17a, as clearly shown in Fig. 2.

As shown, a clean-out door through which the elevator and pick-up mechanism can be rinsed, is hinged in the front of the casing 16. Means (not shown in detail) are provided for detaching sides of the rear housing 12 to facilitate repair or replacement of the motor and driving mechanism housed therein.

The machine is equipped with a pair of horizontally and rearwardly extending guiding handles 53 fixed to the frame of the machine and extending rearwardly from points adjacent the supporting deck 12b.

Operation

In use, our barn cleaning machine is wheeled or propelled through its own power to the barn gutter to be cleaned and the machine is disposed lengthwise in the barn gutter in the position shown in Fig. 1. The motor is then started, constantly driving the dual function elevator mechanism as well as the loading conveyor 13. The machine is guided and controlled by an operator from the two rearwardly extending guiding handles, 53. The clutch control arm 37 at the rear end of one of the handles 53 is then shifted to engage the clutch mechanism and cause driving of the traction wheels 9 at slow speed. The propelling of the machine is thus under the instant control of the operator.

In the operation of the pick-up and elevating mechanism performed by the conveyor mechanism 16, the lower scraping or collection section of the endless conveyor through its rearwardly declined positioning of the conveyor chains, engages the manure and straw in the trough adjacent the top and in the progress of the individual scraper paddles 17a, moves this material rearwardly progressively engaging the material at a lower level and in its relatively fast corner-turning stage, sweeping and scraping the material against the bottom of the gutter upwardly into the elevator shaft provided by the walls 12c and 22. The individual scraper paddles 17a thus most effectively engage the material and scrape the gutters, the operation being continuous whether the machine is travelling under its own propulsion, is stationary or is propelled forwardly through pushing efforts of the operator.

The manure and other material is continuously elevated and dumped at the upper end of the machine upon the inner end of the apron 13a of the cross or loading conveyor 13. This apron is continuously driven and stacks or loads the picked up material into or upon a litter bucket, manure spreader or other vehicle positioned parallel with the gutter of the barn and moved with the slow travel of the machine in its operation.

It will readily be seen that the angulation of the loading conveyor 13 may be readily adjusted through the positioning of the T-foot 47a of the diagonal brace bar 47 to be disposed above obstructions at the rear of the barn gutter or may be swung downwardly in relatively compact relation with the side wall of the housing to clear low obstructions or posts.

During the continuous operation of the collection and elevating mechanism of conveyor 16, the cleaning and stripper bar 30 engages the individual scrapers 17a in their extreme upward movement, yielding to the upward movement of said scrapers, and stripping off the last vestige of material from the individual scraper paddles.

The working parts of our improved device are all housed and sealed and with the exception of the chains of conveyor 16, are maintained free from contact with the chemical-containing manure and other material. The said elevator conveyor chains and paddles may be periodically rinsed and cleansed through the swingable door at the front of the elevator conveyor housing.

From the foregoing description it will be apparent that we have provided a very compact self-contained unitary barn cleaner which quite completely cleans gutters of various lengths in dairy and stock barns, which is portable and does not remain in the gutter to rust or corrode and which is fingertip controlled and produces automatic loading of the removed material under the control of a single operator.

It will of course be understood that various changes may be made in the form, details, arrangement and proportions of the parts without departing from the scope of our invention.

What we claim is:

A portable barn cleaning machine having in combination a very short main frame mounted upon two wheels disposed on a transverse axis thereof for travel over a supporting surface, an upstanding, endless conveyor frame fixedly supported from said main frame and having a forward portion overhanging the front end of said main frame for a short distance, three sets of endless conveyor-supporting and guiding elements mounted transversely of said conveyor frame and being arranged triangularly with one set disposed adjacent the top of said conveyor frame and vertically high above the medial portion of said main frame and with the second and third sets being spaced relatively close together just forwardly of said main frame and at a level close to the ground or wheel-supporting surface, an endless conveyor trained over said three sets of elements and having a series of outwardly extending, transversely disposed scraper members, the height of said scraper members being such as to engage the ground or supporting surface for the machine during their travel between said second and third sets of conveyor-supporting elements, said conveyor forming a relatively short run adjacent the ground or supporting surface declined towards the front end of said main frame and forming an elongated run in the rear portion of said conveyor frame, a wall affixed to said frames and disposed parallel to the rear run of said endless conveyor and slightly declined from the vertical to be engaged by said scraper elements and to form therewith an elevator structure, an upstanding housing supported from said frame and including a portion for housing said conveyor frame and including an upstanding elongated portion disposed rearwardly of said wall, the upper portion thereof defining a receiving chamber, said wall for said elevator structure terminating short of the top of said chamber and the top of said elevator frame, a cross conveyor extending transversely of said frame and supported thereby and having an inner or receiving end disposed in the lower portion of said chamber adjacent the upper edge of said rear wall and mechanism supported from said frame below said chamber for driving said endless conveyor in a direction to move said scraper elements in said short run rearwardly towards the front of said frame and then upwardly or throughout said elongated rear run to elevate material and dump the same upon said cross conveyor.

ARCHIE W. COGGINS.
FRANK W. COGGINS.
MELVIN J. COGGINS.

REFERENCES CITED

The following references are of record in the file of this patent:

UNITED STATES PATENTS

| Number | Name | Date |
|---|---|---|
| 684,618 | Schmidt | Oct. 15, 1901 |
| 726,041 | Fox | Apr. 21, 1903 |
| 1,039,935 | Hanson | Oct. 1, 1912 |
| 1,078,234 | Wycoff | Nov. 11, 1913 |
| 1,428,240 | Kemmerer | Sept. 5, 1922 |
| 1,457,668 | Null | June 5, 1923 |
| 1,520,165 | Witcombe | Dec. 23, 1924 |
| 1,643,094 | Speegle | Sept. 20, 1927 |
| 1,788,995 | Fuerstenau | Jan. 13, 1931 |
| 1,854,349 | Satkowski et al. | Apr. 19, 1932 |
| 2,378,144 | Kittler | June 12, 1945 |